United States Patent
DeBoalt

(10) Patent No.: US 10,352,486 B2
(45) Date of Patent: Jul. 16, 2019

(54) METHOD OF MANUFACTURING A UNITARY GASKET USING TWO RUBBER MATERIALS OF DIFFERENT HARDNESS

(71) Applicant: American Cast Iron Pipe Company, Birmingham, AL (US)

(72) Inventor: Stephen L. DeBoalt, Pelham, AL (US)

(73) Assignee: American Cast Iron Pipe Company, Birminghamn, AL (US)

( * ) Notice: Subject to any disclaimer, the term of this patent is extended or adjusted under 35 U.S.C. 154(b) by 658 days.

(21) Appl. No.: 14/757,571

(22) Filed: Dec. 24, 2015

(65) Prior Publication Data
US 2017/0184230 A1    Jun. 29, 2017

(51) Int. Cl.
| B29C 45/16 | (2006.01) |
| F16L 21/03 | (2006.01) |
| B29C 45/14 | (2006.01) |
| F16L 17/03 | (2006.01) |
| F16L 17/035 | (2006.01) |

(52) U.S. Cl.
CPC .............. *F16L 21/03* (2013.01); *B29C 45/14* (2013.01); *B29C 45/16* (2013.01); *B29C 45/1676* (2013.01); *F16L 17/03* (2013.01); *B29C 45/14418* (2013.01); *B29C 2045/14459* (2013.01); *F16L 17/035* (2013.01)

(58) Field of Classification Search
None
See application file for complete search history.

(56) References Cited

U.S. PATENT DOCUMENTS

| 2,953,398 | A | | 9/1960 | Haugen | |
| 2,991,092 | A | | 7/1961 | Mackay | |
| 3,020,054 | A | * | 2/1962 | Driancourt | F16L 17/035 |
| | | | | | 277/618 |
| 3,963,298 | A | * | 6/1976 | Seiler | F16L 37/0845 |
| | | | | | 277/625 |
| 4,269,802 | A | * | 5/1981 | Linne | B29C 45/1657 |
| | | | | | 264/255 |
| 4,428,604 | A | | 1/1984 | Conner | |
| 4,432,571 | A | | 6/1984 | Conner | |
| 4,456,288 | A | | 6/1984 | Conner | |
| 4,468,367 | A | * | 8/1984 | Beune | B29C 45/1676 |
| | | | | | 264/255 |
| 4,524,505 | A | | 6/1985 | Conner | |
| 4,643,466 | A | | 2/1987 | Conner | |
| 4,685,708 | A | | 8/1987 | Conner | |
| 4,743,422 | A | * | 5/1988 | Kalriis-Nielsen | |
| | | | | | B29C 45/14311 |
| | | | | | 264/255 |
| 4,756,784 | A | * | 7/1988 | Jones | F16L 21/025 |
| | | | | | 156/157 |
| 5,064,207 | A | * | 11/1991 | Bengtsson | B29C 45/1635 |
| | | | | | 277/616 |
| 5,067,751 | A | * | 11/1991 | Walworth | F16L 21/03 |
| | | | | | 285/105 |

(Continued)

FOREIGN PATENT DOCUMENTS

WO    WO2014/204591    * 12/2014

*Primary Examiner* — Edmund H Lee
(74) *Attorney, Agent, or Firm* — Miles & Stockbridge, P.C.; David R. Schaffer

(57) ABSTRACT

Pipe joints and more particularly circular push-on type pipe joints including a flexible gasket having both hard and soft portions and where the soft portion overlaps a flange and an inner curved section of the hard portion.

18 Claims, 9 Drawing Sheets

(56) References Cited

U.S. PATENT DOCUMENTS

| | | | |
|---|---|---|---|
| 5,197,768 A | 3/1993 | Conner | |
| 5,360,218 A * | 11/1994 | Percebois | F16L 37/0845 |
| | | | 277/619 |
| 5,426,842 A | 6/1995 | DeBoalt | |
| 5,520,419 A | 5/1996 | DeBoalt | |
| 7,731,884 B2 * | 6/2010 | Knapp | B29C 45/1671 |
| | | | 264/251 |
| 8,474,830 B2 * | 7/2013 | Knapp | F16L 25/0054 |
| | | | 277/616 |
| 10,107,427 B2 * | 10/2018 | Monteil | F16L 17/035 |
| 2017/0184229 A1 * | 6/2017 | DeBoalt | F16L 21/03 |

* cited by examiner

US 10,352,486 B2

METHOD OF MANUFACTURING A UNITARY GASKET USING TWO RUBBER MATERIALS OF DIFFERENT HARDNESS

CROSS-REFERENCE TO RELATED APPLICATIONS

Co-pending United States Patent Application, titled: Pipe Joint with Low Insertion Load, Improved Retention and Increased High Pressure Sealing Ability Gasket and Method of Manufacture Thereof; Ser. No. 14/757,750, by the same inventor and filed concurrently with this application, the disclosure of which is hereby incorporated in its entirety herein.

TECHNICAL AREA

Pipe joints and more particularly circular push-on type pipe joints including a flexible gasket having both hard and soft sections and where the soft section overlaps a flange and an inner curved portion of the hard section.

SUMMARY

One or more embodiments include a circular gasket that can be made of a hard rubber portion and a soft rubber portion such as defined in the American Water Works Association Standard ANSI/AWWA C111/A21.11, but is not necessarily limited to the materials shown there. The purpose of the gasket is to remain in place, within the mating socket of a belled pipe during insertion assembly of a spigot end of a second pipe into the bell of the first pipe, and to make a dependable seal between the two pipe members when internal or external pressure is applied.

In short, embodiments include a push on gasket with both the hard rubber portion and the soft rubber portion where the hard portion and interface of the hard rubber portion and soft rubber portion has been uniquely shaped in an overlapping configuration to increase the gasket holding force within the socket, to reduce the required spigot insertion assembly force of the gasket joint, and also to increase the sealing area at the pipe spigot surface to improve sealing capabilities.

BRIEF DESCRIPTION OF THE DRAWINGS

Non-limiting and non-exhaustive embodiments of the disclosed subject matter are described with reference to the following figures, wherein like reference numerals and/or indicia refer to like parts throughout the various views unless otherwise precisely specified.

DETAILED DESCRIPTION

In general, one or more embodiments include (i.e., comprise) a pipe joint that includes a first pipe including a bell end with an interiorly extending front lip, for example, an axial flange, formed around an inner surface of an end of the bell end, the interiorly extending flange having a substantially rounded outer edge and a substantially square inner edge with a wall extending outwardly toward and connecting with a first side of a concave groove formed in and extending around the inner surface and adjacent to the flange, a second side of the concave groove extending inwardly from an inner diameter of the concave groove to a rounded corner of a radial protrusion, which angularly extends away from the flange to meet with a substantially flat portion of the inner surface. The pipe joint further includes an annular gasket element including a first hard, relatively inflexible portion and a soft, relatively pliable portion, the first hard, relatively inflexible portion configured as a front "hook" portion to fit into the concave groove and a front side of the second soft, relatively pliable portion attached to a back side of the first hard, relatively inflexible portion, with a recess being formed in and around an outer surface of the annular gasket element between the first hard, relatively inflexible portion and the second soft, relatively pliable portion in a shape reciprocal to the radial protrusion, the second soft, relatively pliable portion having a substantially solid "V"-shaped configuration with an outer extension and an inner extension and a solid center with a substantially dome-shaped central protrusion between the outer and inner extensions, the outer extension having a length greater than the inner extension and having a substantially flat outer end surface portion configured to fit against the substantially flat portion of the inner surface at the end of the bell end, and a section of the second soft, relatively pliable portion overlapping the first hard, relatively inflexible portion and extending past the recess formed in the annular gasket element of the first hard, relatively inflexible portion. The pipe joint still further includes a second pipe including a spigot end with a rounded outer edge configured to fit within and be retained in the bell end of the first pipe and form a fluid-tight seal with the annular gasket element and bell end of the first pipe.

Figure 1:
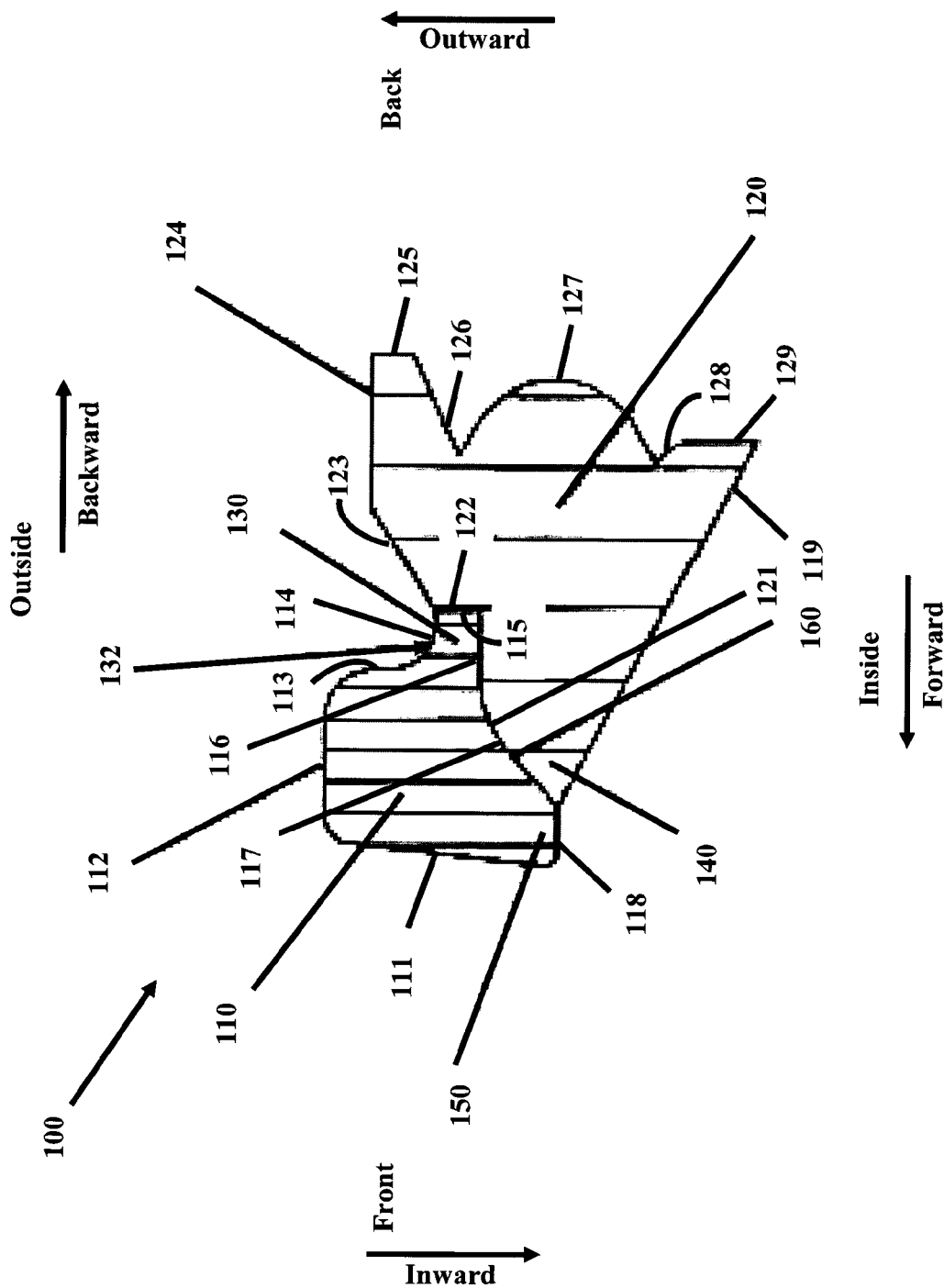
FIG. 1 is a cross-sectional view of a circular push-on type pipe joint gasket including both hard and soft sections, in accordance with an embodiment of the disclosed subject matter.

FIG. 1 is a cross-sectional view of a circular push-on type pipe joint gasket including both hard and soft sections, in accordance with an embodiment of the disclosed subject matter. While the following description is of the gasket cross-section shown in FIG. 1, it is understood that the entire gasket is a continuous, circular gasket that can be made in a variety of different diameters to fit the various pipe diameters in which it is designed to be used. For the sake of clarity and consistency in the following description, FIG. 1 has been labeled to illustrate the descriptive positional terms associated with the gasket. Specifically, a "front" or "front side" is shown on the left of the gasket 100, an "outside" is shown above the gasket 100, a "back" or "back side" is shown to the right of the gasket 100, and an "inside" is shown below the gasket 100 of FIG. 1. In addition, directional movement and/or orientation will be described using "inward" to describe movement and/or orientation running from the outside to the inside; "outward" to describe movement and/or orientation running from the inside to the outside; "forward" to describe movement and/or orientation running from the back to the front; "backward" to describe movement and/or orientation running from the front to the back.

Figure 2:
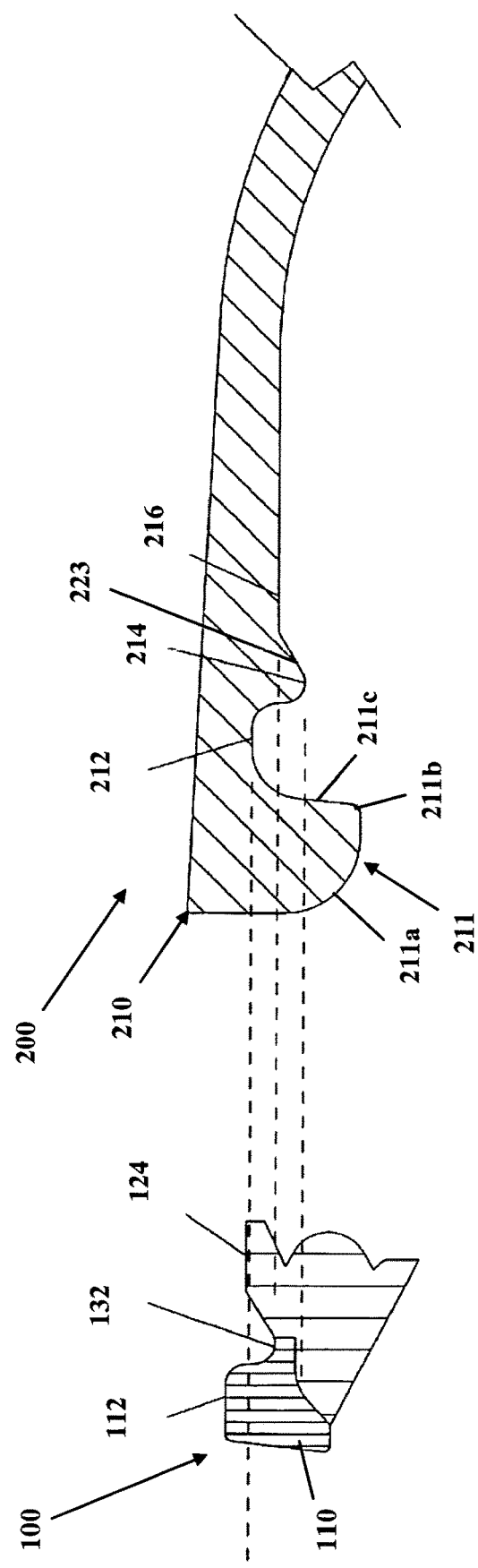
FIG. 2 is a partial longitudinal, cross-sectional view of a bell end of a pipe with a circular push-on type pipe joint with a gasket including both hard and soft sections of FIG. 1 prior to insertion into a bell end of a pipe, in accordance with an embodiment of the disclosed subject matter.
Figure 3:
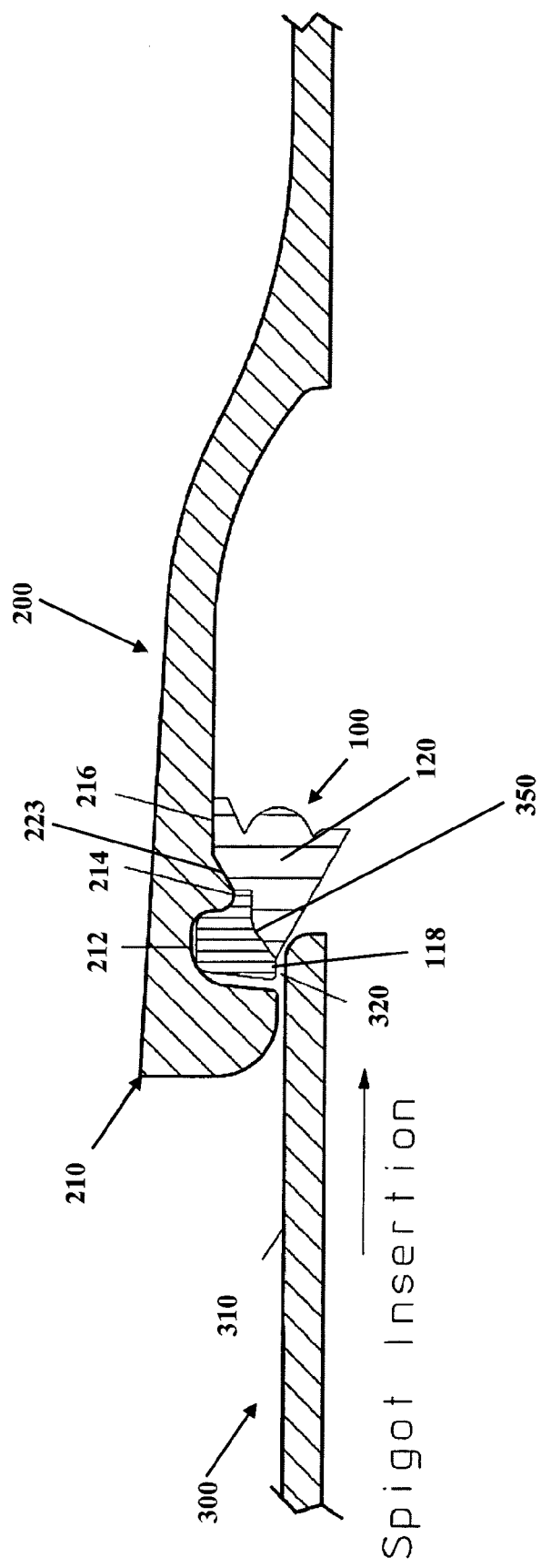
FIG. 3 is a partial longitudinal, cross-sectional view of a bell and spigot pipe joint with the circular push-on type pipe joint with a gasket including both hard and soft sections of FIG. 1 at the start of the insertion of a first pipe's spigot end into a second pipe's bell end, in accordance with an embodiment of the disclosed subject matter.
Figure 4:
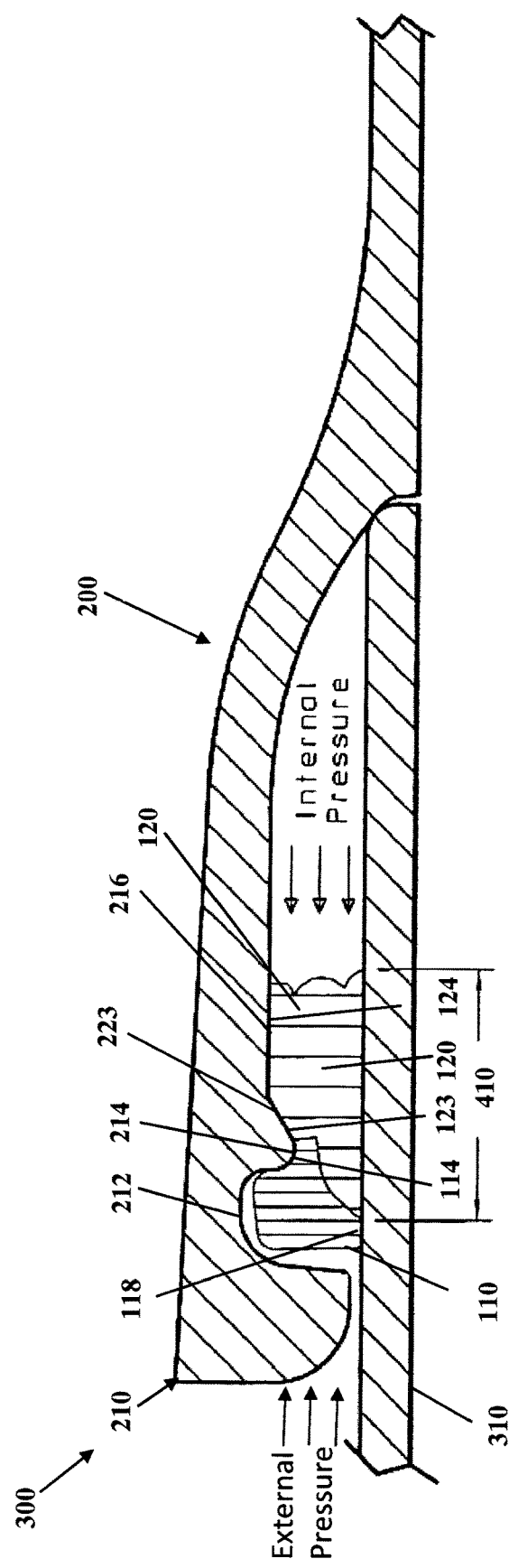
FIG. 4 is a partial longitudinal, cross-sectional view of the bell and spigot pipe joint with the circular push-on type pipe joint with a gasket including both hard and soft sections of FIG. 2 at the completion of the insertion of a first pipe's spigot end into a second pipe's bell end, in accordance with an embodiment of the disclosed subject matter.

In FIG. 1 a gasket 100 includes two parts a front "hook" portion 110 and a back sealing portion 120. The front hook portion 110 has an outside diameter (OD) defined by an outside wall 112 that is larger than a socket or groove 212 inside diameter (ID) of a pipe bell end 210 of pipe 200, as seen in FIG. 2 and in FIG. 1, a top end of a top back wall 113 connects via a rounded outside corner and extends inwardly from a back end of the outside wall 112. The top back wall 113 extends inwardly toward and connects via a curved inside corner to a front end of a lower outside wall 114 with an OD that is larger than an ID of a substantially round radial protrusion 214 of the pipe bell end 210. The substantially round radial protrusion 214 is formed posteriorly to the socket or groove 212 and gasket 100 is shaped, configured and adapted to fit and mate into the socket or groove 212 ID and substantially round radial protrusion 214 ID of a pipe 200 bell end 210 and the back sealing portion 120 is shaped, configured and adapted to fit and mate against a backwardly and outwardly extending back surface 223 of the substantially round radial protrusion 214 and an inside surface of the bell end 216, as seen in FIG. 2, in a manner to hold the gasket in place when a pipe spigot is fully, axially inserted into the gasket socket and when internal (or external) pressure acts on the gasket in the assembled joint as shown in FIG. 3 and FIG. 4. Returning to FIG. 2, the back sealing portion 120 of the gasket 100 is made with a material that is relatively soft and forms a seal between a pipe spigot 310 and the backwardly and outwardly extending back surface 223 of the substantially round radial protrusion 214 and the inside surface of the bell end 216 in the assembled joint. Softer rubber as defined by the ANSI/AWWA C111/A21.11 standard (Table 8) is known to have better sealing properties than very hard rubber, because it molds and more intimately forms itself better around surface inconsistencies and surface roughness which are common in pipe, such as as-cast ductile iron pipe. The softer rubber used in the back sealing portion 120 not only reduces assembly insertion force, but also forms a longer anti-leakage contact pathway 410 with the more sealable softer material effecting a more assured and dependable seal around the spigot pipe. Returning to FIG. 1, the front hook portion 110 is made from a rubber with a hard durometer, for example, a Shore "A" durometer hardness of about 80 to 85. The back sealing portion 120 of the gasket 100 is made from a rubber with a softer durometer, for example, a Shore "A" durometer hardness of about 50 to 65.

In FIG. 1, the front hook portion 110 has an inwardly and slightly forwardly extending front wall 111 that at a top end connects to a front end of the outside wall 112 via a rounded corner. A back end of the outside wall 112 connects via a large rounded corner to the top end of the top back wall 113 that extends substantially perpendicularly inwardly and away from the outside wall 112. The top back wall 113 at a bottom end connects via an inside curved corner to a front end of the lower outside wall 114 that extends away from and substantially perpendicularly to the top back wall 113. The lower outside wall 114 ends and connects at a sharp corner to a top end of an inwardly and perpendicularly extending middle back wall 115. At a bottom end, the middle back wall 115 connects to a back end of a forwardly and perpendicularly extending inside wall first or rear portion 116, which in turn is connected at a front end to a back end of an inwardly curved and forwardly extending inside wall middle portion 117. Together, the inside wall first portion 116 and the inside wall middle portion 117 form a partially curved inner wall portion of the front hook portion 110. A front end of the inwardly curved and forwardly extending inside wall middle portion 117 is connected to a back end of a forwardly extending inside wall front portion 118, which connects via a rounded corner to a bottom end of the front wall 111.

In FIG. 1, the back sealing portion 120 of the gasket 100 has a substantially solid sideways, notched "V"-shape that is connected to the front hook portion 110. Specifically, the cross-sectional shape of the back sealing portion 120 has a curved, lower top surface portion 121 that is reciprocally shaped and attached to the entirety of both the inside wall middle portion 117 and the inside wall first portion 116 of the front hook portion 110, i.e., the partially curved inner wall portion of the front hook portion 110. A back end of the curved, lower top surface portion 121 is connected to a front wall surface 122 that extends outwardly and perpendicularly away from back end of the curved, lower top surface portion 121 and the front wall surface 122 connects to the entirety of the middle back wall 115 of the front "hook" portion 110. A top end of the front wall surface 122 connects to a middle outer surface portion 123 of the back sealing portion 120 that angles backwardly and outwardly away from the top end of the outwardly and perpendicularly extending front wall surface 122 at an acute angle. A recess 132 is defined in an outside of the gasket 100 by the top back wall 113 and the lower outside wall 114 of the front "hook" portion 110 and the middle outer surface 123 of the back sealing portion 120. Although not shown in FIG. 1, in another embodiment of the gasket 100, the lower outside wall 114 and the front hook portion 110 associated therewith can extend backwardly along some or substantially all of the middle outer surface 123. At a top end of the middle outer surface 123, an upper outer surface 124 of the back sealing portion 120 is connected and angles backwardly away from the top end of the middle outer surface 123 at an acute angle and the upper outer surface 124 is substantially perpendicularly aligned with the front wall surface 122. A rear end of the upper outer surface 124 is connected to a top back wall surface 125 of the back sealing portion 120 that extends inwardly and perpendicularly away from the upper outer surface 124. A top inward back wall surface 126 of the back sealing portion 120 is connected to and extends forwardly and inwardly away from a bottom end of the top back wall surface 125. A bottom end of the top inward back wall surface 126 connects to a top end of a convex back wall surface 127 that extends backwardly and inwardly to about a mid-point of its length and then forwardly and inwardly to form a substantially semi-circular cross-sectional shape. A bottom inward back wall surface 128 is connected at its top end to a bottom end of the convex back wall surface 127 and extends inwardly and backwardly away from the convex back wall surface 127 to a top end of a bottom back wall surface 129. The bottom back wall surface 129 extends inwardly away from the bottom inward back wall surface 128 and connects to a back end of an inside wall surface 119 where the bottom back wall surface 129 is substantially parallel to the top back wall surface 125. The inside wall surface 119 extends outwardly and forwardly away from the bottom back wall surface 129 and a front end of the inside wall surface 119 connects to a front end of the curved, lower top surface portion 121.

As seen in FIG. 1, the portion of the back sealing portion 120 shown directly below the inside wall middle portion 117 and the inside wall first portion 116 of the front hook portion 110 provides an extra section of the back sealing portion 120 surface area for contact with a spigot end of a mated pipe. Specifically, when the spigot end of one pipe is inserted into a gasketed, bell end of a second pipe, the extra section of the back sealing portion 120 provides for additional radial, outward pressure to force the outsides of both the front hook portion 110 and the back sealing portion 120 against the inner diameter of the bell end of the second pipe. This is best seen in and will be later described herein in relation to FIG. 4.

Similar to the gasket in FIG. 1, current push-on gaskets rely on designs where the outside diameter of the free gasket is greater than the pipe socket inside diameter, which makes the gasket compress circumferentially and exert a larger residual outward radial force against the pipe socket inside diameter when the gasket is placed inside the pipe socket. This outward radial force increases the gasket's ability to stay in the socket during spigot insertion assembly with another pipe. As illustrated by the dashed lines in FIG. 2, outside surfaces of the recess 132 and the upper outer surface 124, and to a lesser extent outside wall 112, in the pre-installed gasket are greater in diameter than the corresponding inside diameters of the substantially rounded radial protrusion 214, the inside surface of the bell end 216 and to a lesser extent the socket 212. In one embodiment, the gasket 100 most tightly contacts the socket at the circumferential surface mating locations of the recess 132 and the upper outer surface 214. For this reason the hard rubber front hook section 110 has an axial bearing extension 130 with an external surface that forms a portion of the recess 132 which contacts the socket at 214. The harder material of the front hook portion 110 at the recess 132 resists being compressed more than the softer material in the back sealing portion 120. This transfers more of the gasket's outward radial force against the socket inner circumferential surface than it would if the softer more compressible material were located at the recess 132 thus assuring the gasket remains in the pipe socket more securely.

FIG. 2 is a partial longitudinal, cross-sectional view of a bell end of a pipe with a circular push-on type pipe joint with a gasket including both hard and soft sections of FIG. 1 prior to insertion into a bell end of a pipe, in accordance with an embodiment of the disclosed subject matter. In FIG. 2, the bell end 210 of a pipe 200 is shown to include an interior front lip portion 211, which includes a rounded front or exterior edge 211a and a substantially sharp rear or interior edge 211b from which an inner surface 211c of the lip portion 211 extends outwardly toward and merges into a front side of a substantially, concavely-shaped socket inside diameter 212. A back side of the substantially, concavely-shaped socket inside diameter 212 extends inwardly toward and merges into a front side of the substantially rounded radial protrusion 214 on an inner surface to the bell end 210 of the pipe 200. A back side 223 of the substantially rounded radial protrusion 214 continues backwardly at a reduced angle from the front side and merges into the inner surface 216 of the bell end 210 of the pipe 200. The substantially, concavely-shaped socket inside diameter 212 extends about twice as far above the radial protrusion 214 than does the inner surface 216. This permits the recess 132 of the gasket to mate with and be held in place by the radial protrusion 214 on the inside diameter of the bell end 210 of the pipe 200. In general, an outer diameter of the front hook portion 110 measured around the outside wall 112 is at least equal to an inner diameter of the substantially, concavely-shaped socket inside diameter 212. In one or more embodiments, the outer diameter of the front hook portion 110 measured around the outside wall 112 is about 1 to 3 percent (%) larger than the inner diameter of the substantially, concavely-shaped socket inside diameter 212.

FIG. 3 is a partial longitudinal, cross-sectional view of a bell and spigot pipe joint with the circular push-on type pipe joint with a gasket including both hard and soft sections of FIG. 1 installed in a bell end of a second pipe and at the start of the insertion of a first pipe's spigot end into the second pipe's bell end, in accordance with an embodiment of the disclosed subject matter. In FIG. 3, a conical surface 350, which is defined by the forwardly and perpendicularly extending inside wall first portion 116 and the inwardly curved and forwardly extending inside wall middle portion 117, is provided to assure that the hard rubber section is located away from a spigot end 310 of a first pipe 300, thus decreasing insertion forces and providing a longer anti-leak pathway 410 of the softer material contacting against the spigot end 310 of the first pipe 300 to assure better sealing capabilities, as seen in FIG. 4. Returning to FIG. 3, as the spigot end 310 is inserted into the bell end 210, a radial gap 320 is formed between the forwardly extending inside wall front portion 118 of the front hook portion 110 and the entering pipe spigot end 310 to create a buffer from any contact between the hard rubber and the entering pipe spigot surfaces. In general, this gap is formed regardless of the necessary pipe tolerance variations, at least initially. Any radial inward gasket movement of the front hook portion 110 due to frictional effects during the spigot insertion does not result in any compression of the front hook portion 110. The conical surface 350 of the front hook portion 110 on the inside of the gasket is contoured to have as large of a radial and axial dimension as possible in order to increase the radial ring stiffness of the gasket, but also shaped so as to not interfere with an entering pipe's spigot end during insertion assembly. In general, the stiffer the gasket ring strength the more securely the gasket will be retained in the pipe socket during insertion assembly and during sealing.

Specifically, in FIG. 3, the gasket outside diameter includes the front hook portion 110, which fits and mates to the socket inside diameter 212 to hold the gasket in place when the pipe spigot end 310 is axially inserted into the gasket 100 in the socket inside diameter 212 and when internal (or external) pressure acts on the gasket in the assembled joint, as shown in FIG. 4. Returning to FIG. 3, the gasket also includes the back sealing portion 120, which is made of a relatively soft material such as, for example, but not limited to those materials defined in the American Water Works Association Standard ANSI/AWWA C111/A21.11, and a recess 132, which essentially separates the two sections of the gasket and mates with the radial protrusion 214 on the inner surface of the bell end 210 of the pipe 200. The gasket 100 addresses the problems associated with gasketed pipe by using a hard rubber hook that is ideally contoured, so that the hard rubber section 110 of the gasket substantially fills the socket recess 212, but does not substantially contact nor is it compressed by the entering spigot end 310 near the inside diameter of the back sealing portion 120 during insertion assembly.

FIG. 4 is a partial longitudinal, cross-sectional view of the bell and spigot pipe joint with the circular push-on type pipe joint with the gasket 100 including both hard and soft sections 110, 120 of FIG. 2 at the completion of the insertion of the first pipe's spigot end 310 into the second pipe's bell end 210. In FIG. 4, the spigot end 310 of the first pipe 300 is shown fully inserted into the bell end 210 of the second pipe 200 and through the gasket 100. As illustrated in FIG. 4, the front hook portion 110 is shown with an outside portion located in the substantially, concavely-shaped socket inside diameter 212 and the top back wall 113 and the lower outside wall 114 being biased against the substantially rounded radial protrusion 214 of the bell end 210 of the second pipe 200. In addition, as a result of the spigot end 310 being inserted through the gasket 310, the front hook portion 110 has partially rotated toward and is in contact with and around the outside circumference of the spigot end 310. Specifically, the forwardly extending inside wall front portion 118 of the front hook portion 110 is in contact around the outside circumference of the spigot end 310. In addition, the back sealing portion 120 has been compressed and elongated to form a water-tight seal between the outer surface of the spigot end 310 and the inner surface of the bell end 210. The compressed and elongated back sealing portion 120 has a length 410 along the surface of the spigot end 310 that is significantly longer than the uncompressed length of the inside wall surface 119. Likewise, the outer surfaces 123, 124 of the back sealing portion 120 are similarly compressed and elongated against the inner surface 216 of the bell end 210 of the pipe 200. The front hook portion 110 and the back sealing portion 120 cooperate together to form a stationary, water-tight seal between the spigot end 310 and the inner surface of the bell end 210 that resists movement as a result of any internal pressure of the fluid within the pipes pushing out and against the back sealing portion 120, or as a result of any external pressure pushing in and against the front hook portion 110.

Figure 5:
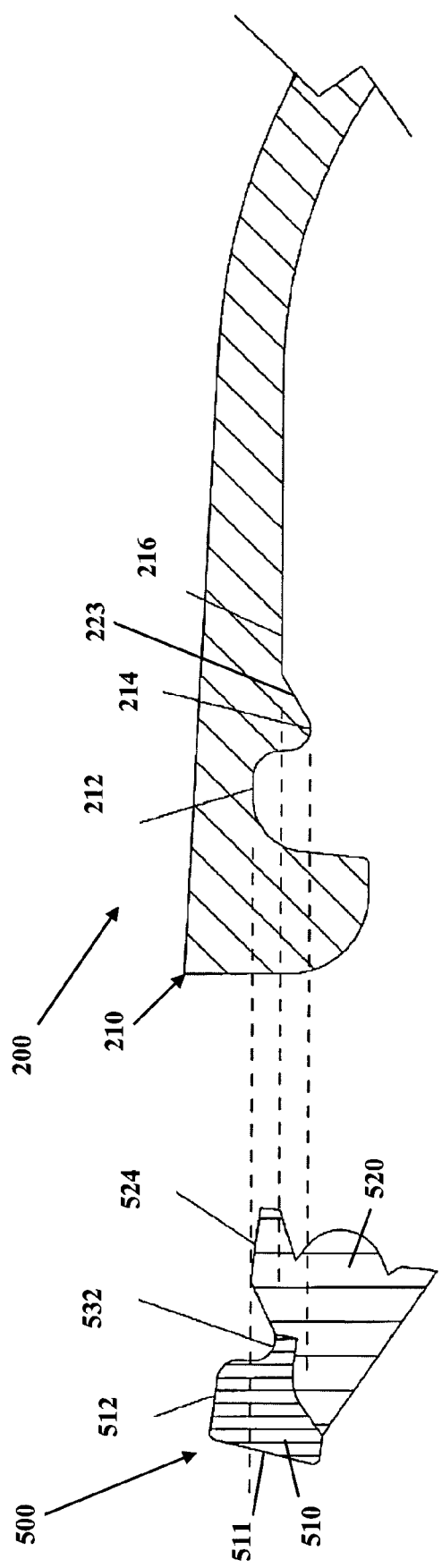
FIG. 5 is a cross-sectional view of a larger circular push-on type pipe joint gasket with both hard and soft sections having an outside diameter that is greater than the gasket of FIG. 1, in accordance with another embodiment of the disclosed subject matter.

FIG. 5 is a cross-sectional view of a larger circular push-on type pipe joint including a gasket with both hard and soft sections having an outside diameter that is greater than the gasket of FIG. 1, in accordance with another embodiment of the disclosed subject matter. In FIG. 5, a gasket 500 in the free state, i.e., prior to installation into the bell end 210 of the pipe 200 as in FIG. 2, and is also made such that all outside diametrical surfaces at a slightly outwardly extending front wall 511, an outside wall 512, an upper outer surface 524 and an outside surface 532 of the gasket 500 are larger than any inner diameter mating surfaces 212, 214, 216 in the mating pipe socket 210. A hook portion 510 of the gasket, however, is larger than the socket by an amount even greater than that of a back sealing portion 520. This increased diameter of the gasket 500 allows even more radial outward force of the gasket to be placed primarily at a recess 532 against the substantially rounded radial protrusion 214 and thus even more securely holding the gasket in place. Also, as shown in relation to the dashed lines in FIG. 5, the gasket 500 is angled or tilted so that the front end of the outside surface of the front hook portion 510 is raised above the back end of the outside surface of the front hook portion 510, and, similarly, the front end of the upper outer surface 524 is raised above the back end of the upper outer surface 524. This configuration serves to provide more pre-compression on the front hook portion 510 than on the upper outer surface 524. In general, an outer diameter of the front hook portion 510 measured around the outside wall 512 is at least equal to an inner diameter of the substantially, concavely-shaped socket inside diameter 212. In one or more embodiments, the outer diameter of the front hook portion 510 measured around the outside wall 112 is about 3 to 5 percent (%) larger than the inner diameter of the substantially, concavely-shaped socket inside diameter 212.

In FIG. 5, the bell end 210 of the pipe 200 from FIG. 2 is shown, including the interior front lip portion 211, the rounded front or exterior edge 211a and the substantially sharp rear or interior edge 211b from which the inner surface 211c of the lip portion 211 extends outwardly toward and merges into the front side of the substantially, concavely-shaped socket inside diameter 212. The back side of the substantially, concavely-shaped socket inside diameter 212 extends inwardly toward and merges into the front side of the substantially rounded radial protrusion 214 on the inner surface to the bell end 210 of the pipe 200. The back side 223 of the substantially rounded radial protrusion 214 continues backwardly at a reduced angle from the front side and merges into the inner surface 216 of the bell end 210 of the pipe 200. The substantially, concavely-shaped socket inside diameter 212 extends about twice as far away from the radial protrusion 214 than does the inner surface 216. This permits the recess 132 of the gasket to mate with and be held in place by the radial protrusion 214 on the inside diameter of the bell end 210 of the pipe 200.

Figure 6:
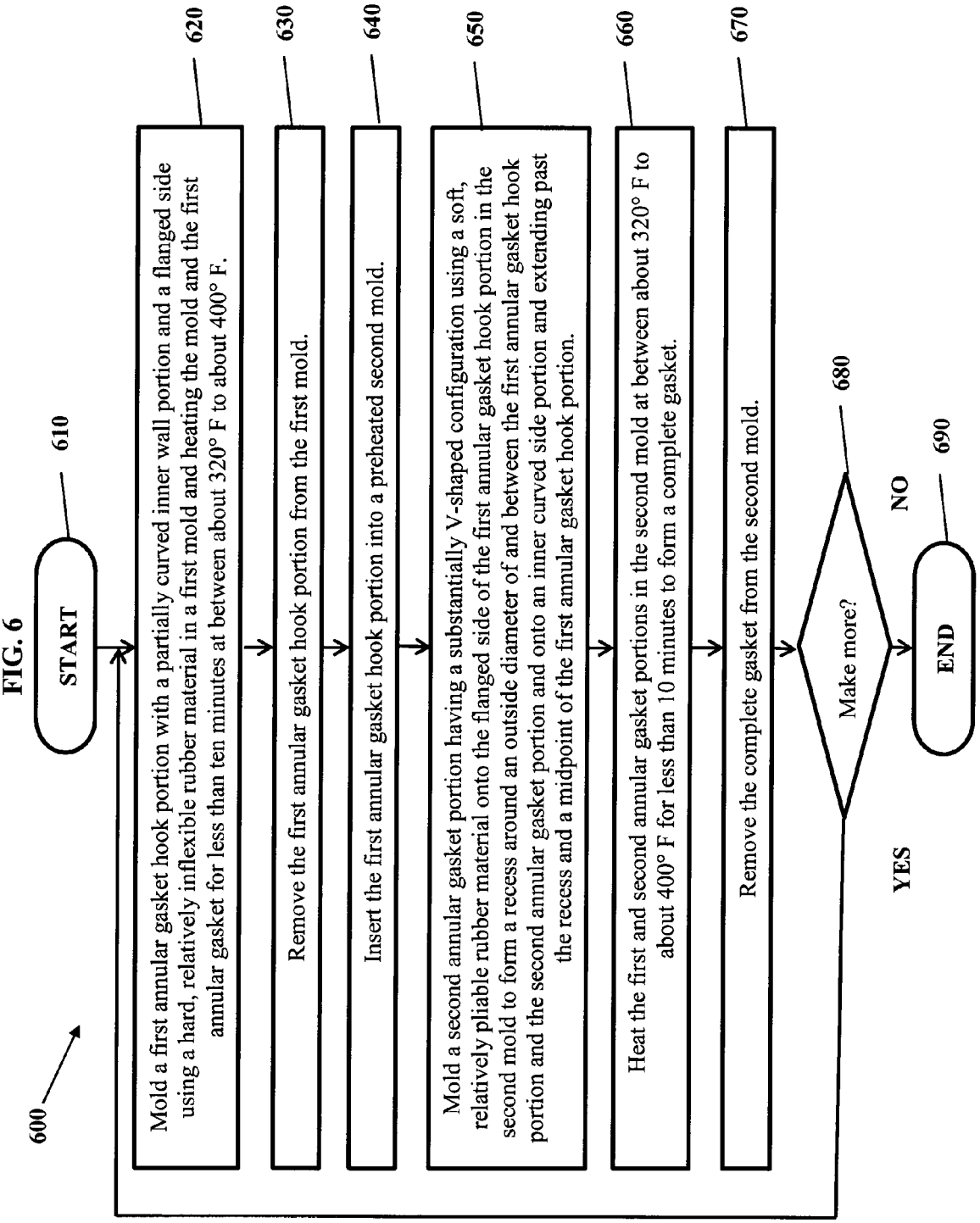
FIG. 6 is a flow chart of a method of manufacturing a circular push-on gasket with both hard and soft sections so that the hard section and soft section are in an overlapping relationship and are permanently affixed to each other, in accordance with another embodiment of the disclosed subject matter.

FIG. 6 is a flow chart of a method of manufacturing a circular push-on gasket with both hard and soft sections so that the hard section and soft section are in an overlapping relationship and are permanently affixed to each other, in accordance with another embodiment of the disclosed subject matter. In FIG. 6, the method 600 of manufacturing a circular push-on gasket with both hard and soft sections so that the hard section and soft section are in an overlapping relationship and are permanently affixed to each other starts 610 and then a first annular gasket hook portion with a flanged side using a hard, relatively inflexible rubber material is molded 620, e.g., injection molded, in a first mold with mold platen temperatures ranging from about 320° F. to about 400° F. for less than 10 minutes to vulcanize the first annular gasket hook portion. After the hard, relatively inflexible rubber material has set, the first annular gasket hook portion with a flanged side can be removed 630 from the first mold. The next step, which can be performed immediately following the prior removing 630 step or at some time later, the first annular gasket hook portion with a flanged side is inserted 640 into a preheated second mold. The second mold includes a complete gasket shape into which the first annular gasket hook portion with a flanged side is inserted. Then, a second annular gasket portion having a substantially V-shaped configuration is molded 650, e.g., injection molded, onto the flanged side of the first annular gasket hook portion using a soft, relatively pliable rubber material to form a recess on an outside diameter of and between the first annular gasket hook portion and the second annular gasket portion and onto an inner curved side portion and extending past the recess and a midpoint of the first annular gasket hook portion. The method further includes heating 660 the first and second annular gasket portions in the second mold to about 320° F. to about 400° F. and the complete gasket is held at these temperatures in the second mold for less than 10 minutes to form a complete gasket. The method also includes removing 670 the completed gasket from the mold, determining 680 whether more gaskets are to be made and, if more are to be made, returning to molding step 620 and, if no more are to be made, then the method ends 690. After the molding process is complete some gaskets may have excess material extending from the sides of the gasket, which is a result of extra rubber being squeezed out of the mold and between the mold portions. As a result, some gaskets are trimmed to remove any excess material.

In the method in FIG. 6, the molding 620 of the first substantially annular portion further includes molding 620 the first substantially annular portion with an outside wall portion having a substantially flat outer diameter with rounded corners, a flat second side wall connected to and depending slightly outwardly away from the substantially flat outer diameter with the flat second side wall on an opposite side from the flange and a bottom end of the flat second side wall connected via a rounded corner to an outer end of a straight inner wall portion that connects at an inner end to an inner end of the partially curved inner wall portion. Molding 620 the first substantially annular portion further includes molding 620 the first hard, relatively inflexible portion using a rubber having a Shore "A" durometer of about 80 to 85.

In the method in FIG. 6, molding 650 the second substantially annular portion further includes molding 650 the second substantially annular portion to have the substantially solid, V-shaped cross section and molding the second substantially annular portion includes molding the second substantially annular portion connected to the partially curved inner wall of the first substantially annular portion to extend past a midpoint of the first substantially annular portion. The method also includes molding the second substantially annular portion by molding the second substantially annular portion using a rubber having a Shore "A" durometer of about 50 to 65. The method still further includes molding the second substantially annular portion by molding the second substantially annular portion using a rubber having a Shore "A" durometer of about 55 to 60.

Figure 7:
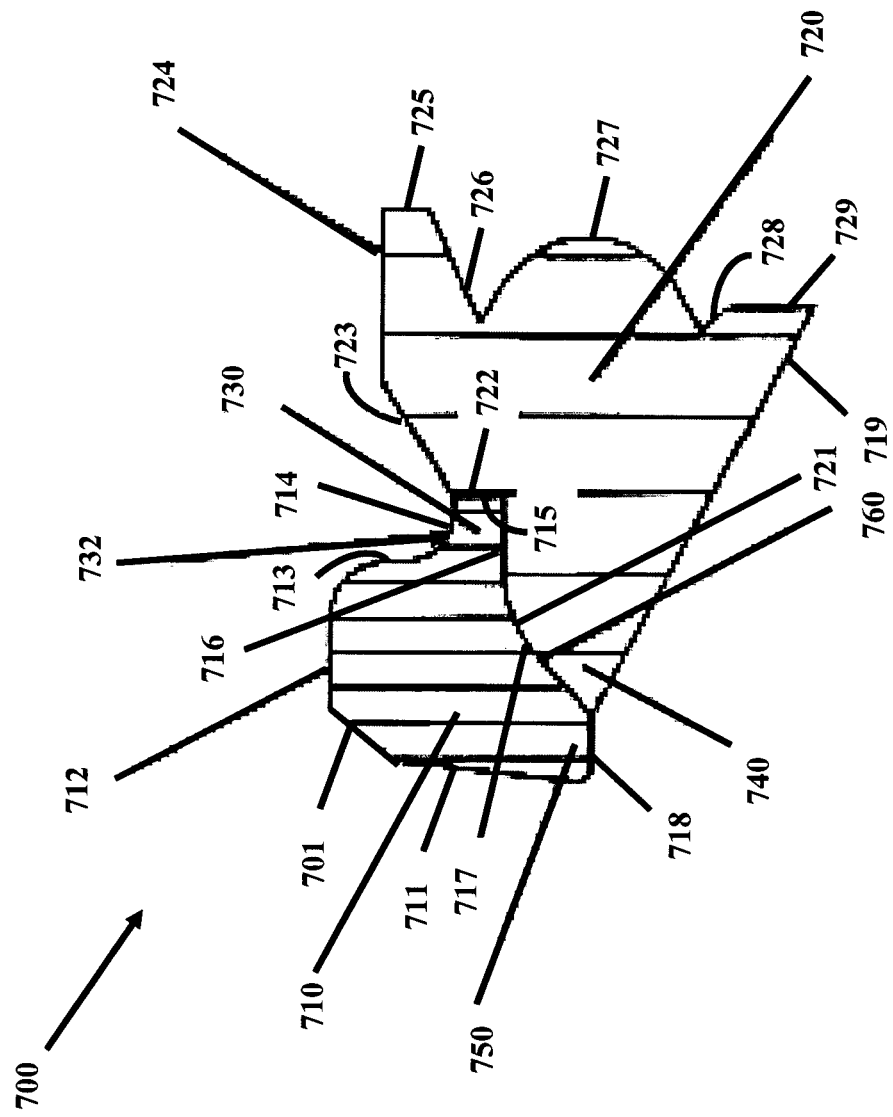
FIG. 7 is a cross-sectional view of a circular push-on type pipe joint gasket including both hard and soft sections, in accordance with another embodiment of the disclosed subject matter.

FIG. 7 is a cross-sectional view of a circular push-on type pipe joint gasket including both hard and soft sections, in accordance with another embodiment of the disclosed subject matter. While the following description is of the gasket cross-section shown in FIG. 7, as in FIG. 1, it is understood in FIG. 7 that the entire gasket is a continuous, circular gasket that can be made in a variety of different diameters to fit the various pipe diameters in which it is designed to be used. In FIG. 7 a gasket 700 includes two parts a front "hook" portion 710 and a back sealing portion 720. The front hook portion 710 has an outside diameter (OD) defined by an outside wall 712 that is larger than a socket or groove 212 inside diameter (ID) of a pipe bell end 210, and a top back wall 713 that depends inwardly from the outside wall 712 toward and connects to a lower outside wall 714 with an OD that is larger than an ID of a substantially round radial protrusion 214 of the pipe bell end 210. The substantially round radial protrusion 214 is formed posteriorly to the socket or groove 212 and gasket 700 is shaped, configured and adapted to fit and mate into the socket or groove 212 ID and substantially round radial protrusion 214 ID of a pipe 200 bell end 210 and the back sealing portion 720 is shaped, configured and adapted to fit and mate against a backwardly and outwardly extending back surface 223 of the substantially round radial protrusion 214 and an inside surface of the bell end 216, similar to and as seen previously in FIG. 2, in a manner to hold the gasket in place when a pipe spigot is fully, axially inserted into the gasket socket and when internal (or external) pressure acts on the gasket in the assembled joint similar to and as shown previously in FIG. 3 and FIG. 4. The back sealing portion 720 of the gasket 700 is made with a material that is relatively soft and forms a seal between the pipe spigot 310 and the backwardly and outwardly extending back surface 223 of the substantially round radial protrusion 214 and the inside surface of the bell end 216 in the assembled joint. Softer rubber as defined by the ANSI/AWWA C111/A21.11 standard (Table 8) is known to have better sealing properties than very hard rubber, because it molds and more intimately forms itself better around surface inconsistencies and surface roughness which are common in pipe, such as as-cast ductile iron pipe. The softer rubber used in the back sealing portion 120 not only reduces assembly insertion force, but also forms a longer anti-leakage contact pathway 410 with the more sealable softer material effecting a more assured and dependable seal around the spigot pipe. Returning to FIG. 7, the front hook portion 710 is made from a rubber with a hard durometer, for example, a Shore "A" durometer hardness of about 80 to 85. A back sealing portion 120 of the gasket 100 is made from a rubber with a softer durometer, for example, a Shore "A" durometer hardness of about 50 to 65.

In FIG. 7, the front hook portion 710 has a inwardly and slightly outwardly extending front wall 711 that at a top end connects to a lower end of an outwardly extending chamfered section 701 via an obtuse angled corner and a top end of the chamfered section 701 connects to a front end of the outside wall 712 via another obtuse angled corner. The chamfered section 701 permits an easier insertion of the gasket 700 into the groove 212. A back end of the outside wall 712 connects via a large rounded corner to a top end of the top back wall 713 that extends substantially perpendicularly inward and away from the outside wall 712. The top back wall 713 at a bottom end connects via an inside curved corner to a front end of the lower outside wall 714 that extends away from and substantially perpendicularly to the top back wall 713. The lower outside wall 714 ends and connects at a sharp corner to a top end of an inwardly and perpendicularly extending middle back wall 715. At a bottom end, the middle back wall 715 connects to a back end of an inwardly and perpendicularly extending inside wall first portion 716, which is in turn connected at a front end to a back end of an inwardly curved and forwardly extending inside wall middle portion 717. Together, the inside wall first portion 716 and the inside wall middle portion 717 form a partially curved inner wall portion of the front hook portion 710. A front end of the inwardly curved and forwardly extending inside wall middle portion 717 is connected to a back end of an outwardly extending inside wall front portion 718, which connects via a rounded corner to a bottom end of the front wall 711.

In FIG. 7, the back sealing portion 720 of the gasket 700 has a substantially solid sideways, notched "V"-shape that is connected to the front hook portion 710. Specifically, the cross-sectional shape of the back sealing portion 720 has a curved, lower top surface 721 that is reciprocally shaped and attached to the entirety of both the inside wall middle portion 717 and the inside wall first portion 716 of the front hook portion 710, i.e., the partially curved inner wall portion of the front hook portion 710. A back end of the curved, lower top surface portion 721 is connected to a front wall surface 722 that extends outwardly and perpendicularly away from back end of the curved, lower top surface portion 721 and the front wall surface 722 connects to the entirety of the middle back wall 715 of the front "hook" portion 710. A top end of the front wall surface 722 connects to a middle outer surface portion 723 of the back sealing portion 720 that angles backwardly and outwardly away from the top end of the outwardly and perpendicularly extending front wall surface 722 at an acute angle. A recess 732 is defined in an outside surface of the gasket 700 by the top back wall 713 and the lower outside wall 714 of the front "hook" portion 710 and the middle outer surface 723 of the back sealing portion 720. Although not shown in FIG. 7, in another embodiment of the gasket 100, the lower outside wall 714 and the front hook portion 710 associated therewith can extend backwardly along some or substantially all of the middle outer surface 723. At a top end of the middle outer surface 723, an upper outer surface 724 of the back sealing portion 720 is connected and angles backwardly away from the top end of the middle outer surface 723 at an acute angle and the upper outer surface 724 is substantially perpendicularly aligned with the front wall surface 722. A rear end of the upper outer surface 724 is connected to a top back wall surface 725 of the back sealing portion 720 that extends inwardly and perpendicularly away from the upper outer surface 724. A top inward back wall surface 726 of the back sealing portion 720 is connected to and extends forwardly and inwardly away from a bottom end of the top back wall surface 725. A bottom end of the top inward back wall surface 726 connects to a top end of a convex back wall surface 727 that extends backwardly and inwardly to about a mid-point of its length and then forwardly and inwardly to form a substantially semi-circular cross-sectional shape. A bottom inward back wall surface 728 is connected at its top end to a bottom end of the convex back wall surface 727 and extends inwardly and backwardly away from the convex back wall surface 727 to a top end of a bottom back wall surface 729. The bottom back wall surface 729 extends inwardly away from the bottom inward back wall surface 728 and connects to a back end of an inside wall surface 719 where the bottom back wall surface 729 is substantially parallel to the top back wall surface 725. The inside wall surface 719 extends outwardly and forwardly away from the bottom back wall surface 729 and a front end of the inside wall surface 719 connects to a front end of the curved lower top surface portion 721.

As seen in FIG. 7, the portion of the back sealing portion 720 shown directly below the inside wall middle portion 717 and the inside wall first portion 716 of the front hook portion 710 provides an extra section of the back sealing portion 720 surface area for contact with a spigot end of a mated pipe. Specifically, when the spigot end of one pipe is inserted into a gasketed, bell end of a second pipe, the extra section of the back sealing portion 720 provides for additional radial, outward pressure to force the outsides of both the front hook portion 710 and the back sealing portion 720 against the inner diameter of the bell end of the second pipe 200. This is best seen in and will be later described herein in relation to FIG. 8. In general, an outer diameter of the front hook portion 710 measured around the outside wall 712 is at least equal to an inner diameter of the substantially, concavely-shaped socket inside diameter 712. In one or more embodiments, the outer diameter of the front hook portion 710 measured around the outside wall 112 is about 1 to 3 percent (%) larger than the inner diameter of the substantially, concavely-shaped socket inside diameter 212.

Similar to the gasket in FIG. 7, current push-on gaskets rely on designs where the outside diameter of the free gasket is greater than the pipe socket inside diameter, which makes the gasket compress circumferentially and exert a larger residual outward radial force against the pipe socket inside diameter when the gasket is placed inside the pipe socket. This outward radial force increases the gasket's ability to stay in the socket during spigot insertion assembly with another pipe. As illustrated by the dashed lines in FIG. 8, outside surfaces of the recess 732 and the upper outer surface 724, and to a lesser extent the outside wall 712, in the pre-installed gasket are greater in diameter than the corresponding socket inside diameters of the substantially rounded radial protrusion 214, the inside surface of the bell end 216 and to a lesser extent the socket 212. In one embodiment, the gasket 700 most tightly contacts the socket at the circumferential surface mating locations of the recess 732 and the upper outer surface 714. For this reason the hard rubber front hook portion 710 has an axial bearing extension 730, for example a flange portion 730, with an external surface that forms a portion of the recess 732 which contacts the socket at 214. The harder material of the front hook portion 110 at the recess 732 resists being compressed more than the softer material in the back sealing portion 720. This transfers more of the gasket's outward radial force against the socket inner circumferential surface than it would if the softer more compressible material were located at the recess 732 thus assuring the gasket remains in the pipe socket more securely.

Figure 8:
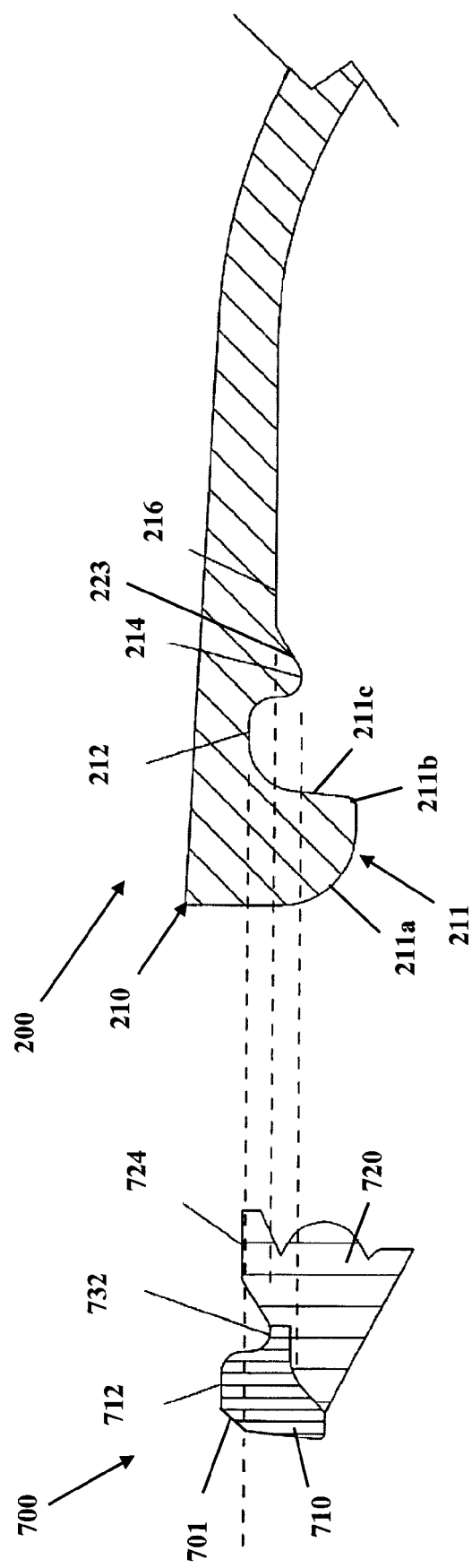
FIG. 8 is a partial longitudinal, cross-sectional view of a bell end of a pipe with a circular push-on type pipe joint with a gasket including both hard and soft sections of FIG. 7 prior to insertion into a bell end of a pipe, in accordance with another embodiment of the disclosed subject matter.

FIG. 8 is a partial longitudinal, cross-sectional view of a bell end of a pipe with a circular push-on type pipe joint with a gasket including both hard and soft sections of FIG. 7 prior to insertion into a bell end of a pipe, in accordance with another embodiment of the disclosed subject matter. In FIG. 8, the bell end 210 of a pipe 200 is shown to include an interior front lip portion 211, which includes a rounded front or exterior edge 211*a* and a substantially sharp rear or interior edge 211*b* from which an inner surface 211*c* of the lip portion 211 extends outwardly toward and merges into a front side of a substantially, concavely-shaped socket inside diameter 212. A back side of the substantially, concavely-shaped socket inside diameter 212 extends inwardly toward and merges into a front side of the substantially rounded radial protrusion 214 on an inner surface to the bell end 210 of the pipe 200. A back side 223 of the substantially rounded radial protrusion 214 continues backwardly at a reduced angle from the front side and merges into the inner surface 216 of the bell end 210 of the pipe 200. The substantially, concavely-shaped socket inside diameter 212 extends about twice as far above the radial protrusion 214 than does the inner surface 216. This permits the recess 732 of the gasket to mate with and be held in place by the radial protrusion 214 on the inside diameter of the bell end 210 of the pipe 200.

Figure 9:
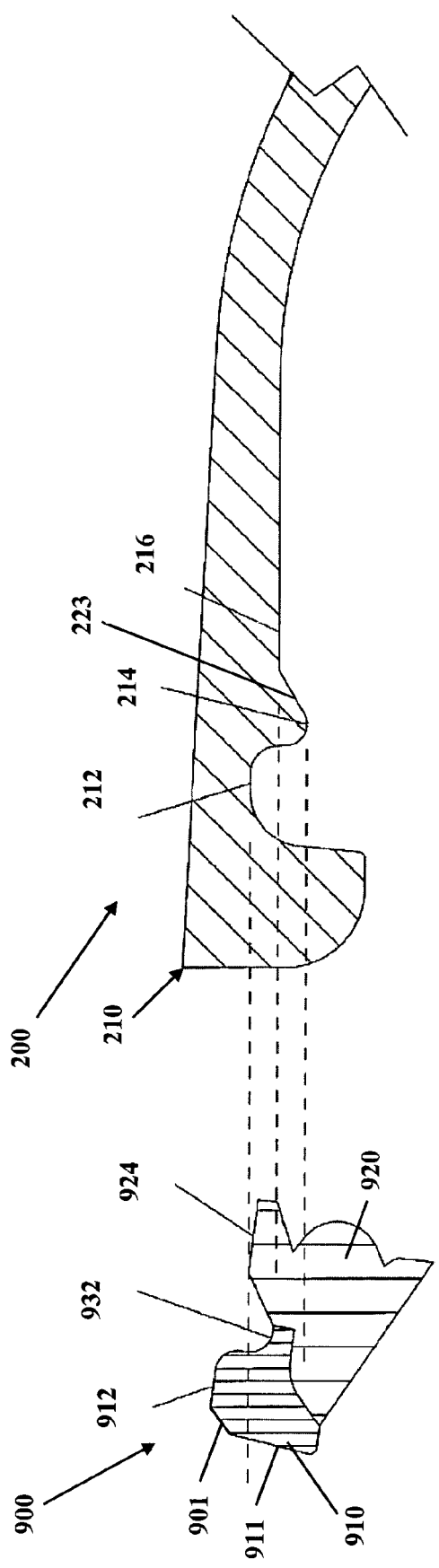
FIG. 9 a cross-sectional view of a larger circular push-on type pipe joint gasket with both hard and soft sections having an outside diameter that is greater than the gasket of FIG. 7, in accordance with another embodiment of the disclosed subject matter.

FIG. 9 is a cross-sectional view of a larger circular push-on type pipe joint including a gasket with both hard and soft sections having an outside diameter that is greater than the gasket of FIG. 7, in accordance with another embodiment of the disclosed subject matter. In FIG. 9, a gasket 900 in the free state, i.e., prior to installation into the bell end 210 of the pipe 200 as in FIG. 2, and is also made such that all outside diametrical surfaces at a chamfered section 901, a slightly outwardly extending front wall 911, an outside wall 912, an upper outer surface 924 and an outside surface 932 of the gasket 900 are larger than any inner diameter mating surfaces 212, 214, 216 in the mating pipe socket 210. A hook portion 910 of the gasket, however, is larger than the socket by an amount even greater than that of a back sealing portion 920. This increased diameter of the gasket 900 allows even more radial outward force of the gasket to be placed primarily at a recess 932 against the substantially rounded radial protrusion 214 and thus even more securely holding the gasket in place. The chamfered section 901 permits an easier insertion of the larger gasket 900 into the groove 212.

Also, as shown in relation to the dashed lines in FIG. 9 and similar to the embodiment in FIG. 5, in FIG. 9, the gasket 900 is angled or tilted so that the front end of the outside surface of the front hook portion 910 is raised above the back end of the outside surface of the front hook portion 910, and, similarly, the front end of the upper outer surface 924 is raised above the back end of the upper outer surface 924. This configuration serves to provide more pre-compression on the front hook portion 910 than on the upper outer surface 924. In general, an outer diameter of the front hook portion 910 measured around the outside wall 912 is at least equal to an inner diameter of the substantially, concavely-shaped socket inside diameter 212. In one or more embodiments, the outer diameter of the front hook portion 910 measured around the outside wall 912 is about 3 to 5 percent (%) larger than the inner diameter of the substantially, concavely-shaped socket inside diameter 212.

In FIG. 9, the bell end 210 of the pipe 200 from FIG. 2 is shown, including the interior front lip portion 211, the rounded front or exterior edge 211a and the substantially sharp rear or interior edge 211b from which the inner surface 211c of the lip portion 211 extends outwardly toward and merges into the front side of the substantially, concavely-shaped socket inside diameter 212. The back side of the substantially, concavely-shaped socket inside diameter 212 extends inwardly toward and merges into the front side of the substantially rounded radial protrusion 214 on the inner surface to the bell end 210 of the pipe 200. The back side of the substantially rounded radial protrusion 214 continues backwardly at a reduced angle from the front side and merges into the inner surface 216 of the bell end 210 of the pipe 200. The substantially, concavely-shaped socket inside diameter 212 extends about twice as far above the radial protrusion 214 than does the inner surface 216. This permits the recess 932 of the gasket to mate with and be held in place by the radial protrusion 214 on the inside diameter of the bell end 210 of the pipe 200.

In an embodiment of the disclosed subject matter, a pipe joint includes a first pipe including a bell end with an interiorly extending axial flange formed around an inner surface of an end of the bell end, the interiorly extending front lip, for example, an axial flange, having a substantially rounded outer edge and a substantially square inner edge with a wall extending outwardly toward and connecting with a first side of a concave groove formed in and extending around the inner surface and adjacent to the flange, a second side of the concave groove extending inwardly from a bottom of the concave groove to a rounded corner of a radial protrusion, which angularly extends away from the flange to meet with a substantially flat portion of the inner surface. The pipe joint further includes an annular gasket element including a first hard, relatively inflexible portion and a soft, relatively pliable portion, the first hard, relatively inflexible portion configured as a front hook portion to fit into the concave groove and a front side of the second soft, relatively pliable portion attached to a back side of the first hard, relatively inflexible portion, with a recess being formed in and around an outer surface of the annular gasket element between the first hard, relatively inflexible portion and the second soft, relatively pliable portion in a shape reciprocal to the radial protrusion, the second soft, relatively pliable portion having a substantially solid V-shaped configuration with an outer extension and an inner extension and a solid center with a substantially dome-shaped central protrusion between the outer and inner extensions, the outer extension having a length greater than the inner extension and having a substantially flat outer end surface portion configured to fit against the substantially flat portion of the inner surface of the end of the bell end, and a section of the second soft, relatively pliable portion overlapping the first hard, relatively inflexible portion and extending past the recess formed in the annular gasket element of the first hard, relatively inflexible portion. The pipe joint still further includes a second pipe including a spigot end with a rounded outer edge configured to fit within and be retained in the bell end of the first pipe and form a fluid-tight seal with the annular gasket element and bell end of the first pipe.

In an embodiment of the disclosed subject matter, a locking and sealing member is configured to axially restrain a spigot end of a first pipe and form a liquid-tight seal between the spigot end of the first pipe and a bell end of a second pipe, the locking and sealing member including an annular gasket element including a first hard, relatively inflexible portion attached to a second soft, relatively pliable portion. The first hard, relatively inflexible portion being configured as a front hook portion to fit into a concave groove on an inner surface of a bell end of a second pipe and a front side of the second soft, relatively pliable portion being attached to a back side of the first hard, relatively inflexible portion, with a recess being formed in an outer surface of the annular gasket element between the first hard, relatively inflexible portion and the second soft, relatively pliable portion in a shape reciprocal to a radial protrusion on the inner surface of the bell end of the first pipe. The second soft, relatively pliable portion having a substantially solid, V-shaped configuration with an outer extension, an inner extension and a substantially dome-shaped central protrusion between the outer and inner extensions on a side of the annular gasket element away from the first hard, relatively inflexible portion, the outer extension extending farther away from the second soft, relatively pliable portion than the inner extension and the outer extension having a substantially flat outer end surface portion configured to fit against a substantially flat portion of an inner surface of the bell end of the second pipe, and a section of the second soft, relatively pliable portion overlapping the first hard, relatively inflexible portion and extending past the recess formed in the annular gasket element and past a middle of the first hard, relatively inflexible portion.

In an embodiment of the disclosed subject matter, a method of manufacturing a unitary gasket having using two rubber materials of different hardness, the method including molding a first substantially annular portion using a hard, relatively inflexible rubber material, the first substantially annular portion having a partially curved inner wall portion and a flange with a substantially flat outer side wall on a first side. The method further including molding a second substantially annular portion using a second, soft relatively pliable rubber material to be permanently affixed to the substantially flat outer side wall of the flange and the partially curved inner wall of the first substantially annular portion, an interface between the substantially flat outer side wall of the flange and the second substantially annular portion being positioned in about a middle of a recess formed between the first substantially annular portion and the second substantially annular portion.

In an embodiment of the disclosed subject matter, a locking and sealing member configured to axially restrain a spigot end of a first pipe and form a liquid-tight seal between the spigot end of the first pipe and a bell end of a second pipe, the locking and sealing member including an annular gasket element having a first hard, relatively inflexible portion attached to a second soft, relatively pliable portion. The first hard, relatively inflexible portion being configured as a front hook portion to fit into a concave groove on an inner surface of a bell end of a second pipe and a front side of the second soft, relatively pliable portion being attached to a back side of the first hard, relatively inflexible portion, with a recess being formed in an outer surface of the annular gasket element between the first hard, relatively inflexible portion and the second soft, relatively pliable portion in a shape reciprocal to a radial protrusion on the inner surface of the bell end of the first pipe. The first hard, relatively inflexible portion having an inwardly and slightly outwardly extending front wall with a top end of the front wall being connected to a lower end of an outwardly and backwardly extending chamfered section and an upper end of the chamfered section being connected to a first end of an outside wall of the first hard, relatively inflexible portion. The second soft, relatively pliable portion having a substantially solid, V-shaped configuration with an outer extension, an inner extension and a substantially dome-shaped central protrusion between the outer and inner extensions on a side of the annular gasket element extending away from the first hard, relatively inflexible portion, the outer extension extending farther away from the second soft, relatively pliable portion than the inner extension and the outer extension having a substantially flat outer end surface portion configured to fit against a substantially flat portion of an inner surface of the bell end of the second pipe. A section of the second soft, relatively pliable portion overlapping the first hard, relatively inflexible portion and extending past the recess formed in the annular gasket element toward a front wall and past a middle of the first hard, relatively inflexible portion.

While the invention(s) has/have been described in conjunction with a number of embodiments, it is evident that many alternatives, modifications and variations would be or are apparent to those of ordinary skill in the applicable arts. Accordingly, Applicant intends to embrace all such alternatives, modifications, equivalents, and variations that are within the spirit and scope of the invention(s) described herein.

What is claimed is:

1. A method of manufacturing a unitary gasket using two rubber materials of different hardness, the method comprising:

molding a first substantially annular portion using a hard, substantially inflexible rubber material in a first mold, the first substantially annular portion having a partially curved inside wall portion defining a bottom of an axial bearing extension with a substantially flat inside wall rear portion connected at a back end to an inside end of a substantially flat middle back wall portion that perpendicularly extends outwardly away from the substantially flat inside wall rear portion and an outside end of the substantially flat middle back wall portion perpendicularly connected to a back end of a lower outside wall that extends forwardly away from the substantially flat middle back wall portion and a front end of the lower outside wall connected to a lower end of a top back wall that extends outwardly away from the lower outside wall, and together the lower outside wall and the top back wall define a curved front wall portion of a recess;

removing the first substantially annular portion from the first mold;

inserting the first substantially annular portion into a separate, preheated second mold;

molding in the preheated second mold a second substantially annular portion using a second, soft substantially pliable rubber material to be permanently affixed to the substantially flat middle back wall portion of the axial bearing extension and to the partially curved inside wall portion of the first substantially annular portion, an interface between the substantially flat outer side wall of the axial bearing extension and the second substantially annular portion being positioned in about a middle of the recess formed between the first substantially annular portion and the second substantially annular portion, the second substantially annular portion including an outside flange defined by an upper outer surface, and a top inward back wall surface extending backwardly away from the recess and an inside flange defined by a bottom inward back wall surface, a bottom wall surface and an inside wall surface extending backwardly and inwardly away from the first substantially annular portion, and a back sealing portion with a convex back wall surface defined between the outside flange and the inside flange of the second substantially annular portion;

heating the first and second annular gasket portions in the second mold at about 300° F. for about 10 to 15 minutes to form a complete gasket; and removing the complete gasket from the second mold.

2. The method of claim 1 wherein molding the first substantially annular portion further comprises:

molding the first substantially annular portion with an outside wall portion having a substantially flat outer diameter with rounded corners, a flat second side wall connected to and depending inwardly and slightly forwardly away from the substantially flat outer diameter with the flat second side wall on an opposite side from the axial bearing extension and a bottom end of the flat second side wall connected via a rounded corner to a front end of a straight inside wall portion that extends backwardly to and connects at a back end to an inner end of the partially curved inside wall portion.

3. The method of claim 2 wherein molding the first substantially annular portion further comprises:

molding the first substantially annular portion using a rubber having a Shore "A" durometer of about 80 to 85.

4. The method of claim 3 wherein molding the second substantially annular portion further comprises:

molding the second substantially annular portion using a rubber having a Shore "A" durometer of about 50 to 65.

5. The method of claim 1 wherein molding the second substantially annular portion further comprises:

molding the second substantially annular portion to have a substantially solid, V-shaped cross section.

6. The method of claim 5 wherein molding the second substantially annular portion further comprises:

molding the second substantially annular portion connected to the partially curved inner wall of the first substantially annular portion to extend past a midpoint of the first substantially annular portion.

7. The method of claim 6 wherein molding the first substantially annular portion further comprises:

molding the second substantially annular portion using a rubber having a Shore "A" durometer of about 80 to 85.

8. The method of claim 7 wherein molding the second substantially annular portion further comprises:
molding the second substantially annular portion using a rubber having a Shore "A" durometer of about 50 to 65.

9. The method of claim 5 wherein molding the first substantially annular portion further comprises:
molding the connection at the front end of the outside wall and the outside end of the front wall to be curved.

10. The method of claim 1 wherein molding the first substantially annular portion further comprises:
molding the connection at the front end of the outside wall and the outside end of the front wall to be a chamfered section.

11. A method of manufacturing a unitary gasket using two rubber materials of different hardness, the method comprising:
molding a first substantially annular portion using a hard, substantially inflexible rubber material in a first mold, the first substantially annular portion having a partially curved inside wall portion including an inside wall middle portion connected at a back end to a front end of an inside wall rear portion that defines a bottom of an axial bearing extension, a back end of the inside wall rear portion connected at a back end to an inside end of a substantially flat middle back wall portion that perpendicularly extends outwardly away from the inside wall rear portion and an outside end of the substantially flat back middle wall portion perpendicularly connected to a back end of a lower outside wall that extends forwardly away from the substantially flat middle back wall portion and a front end of the lower outside wall connected to an inside end of a top back wall that extends outwardly away from the lower outside wall, and together the lower outside wall and the top back wall define a curved front wall portion of a recess, an outside end of the top back wall connected to a back end of an outside wall and a front end of the outside wall connected to a back end of a chamfered section that extends forwardly and inwardly away from the outside wall, a front end of the chamfered section connected to an outside end of a front wall that extends inwardly and forwardly away from the chamfered section, an inside end of the front wall connected to a front end of an inside wall front portion that extends backwardly away from the front wall, and a back end of the inside wall front portion connected to a front end of the inside wall middle portion;
removing the first substantially annular portion from the first mold;
inserting the first substantially annular portion into a separate, preheated second mold;
molding in the preheated second mold a second substantially annular portion using a second, soft substantially pliable rubber material to be permanently affixed to the substantially flat middle back wall portion of the axial bearing extension and to the partially curved inside wall portion of the first substantially annular portion, an interface between the substantially flat outer side wall of the axial bearing extension and the second substantially annular portion being positioned in about a middle of the recess formed between the first substantially annular portion and the second substantially annular portion, the second substantially annular portion including an outside flange defined by an upper outer surface, a top back wall surface and a top inward back wall surface extending backwardly away from the recess and an inside flange defined by a bottom inward back wall surface, a bottom back wall surface and inside the wall surface extending backwardly and inwardly away from the first substantially annular portion, and a back sealing portion with a convex back wall surface defined between the outside flange and the inside flange of the second substantially annular portion;
heating the first and second annular gasket portions in the second mold at about 300° F. for about 10 to 15 minutes to form a complete gasket; and
removing the complete gasket from the second mold.

12. The method of claim 11 wherein molding the first substantially annular portion further comprises:
molding the outside wall portion having a substantially flat outer diameter.

13. The method of claim 12 wherein molding the first substantially annular portion further comprises:
molding the first substantially annular portion using a rubber having a Shore "A" durometer of about 80 to 85.

14. The method of claim 13 wherein molding the second substantially annular portion further comprises:
molding the second substantially annular portion using a rubber having a Shore "A" durometer of about 50 to 65.

15. The method of claim 11 wherein molding the second substantially annular portion further comprises:
molding the second substantially annular portion to have a substantially solid, V-shaped cross section.

16. The method of claim 15 wherein molding the second substantially annular portion further comprises:
molding the second substantially annular portion connected to the partially curved inner wall of the first substantially annular portion to extend past a midpoint of the first substantially annular portion.

17. The method of claim 16 wherein molding the first substantially annular portion further comprises:
molding the first substantially annular portion using a rubber having a Shore "A" durometer of about 80 to 85.

18. The method of claim 17 wherein molding the second substantially annular portion further comprises:
molding the second substantially annular portion using a rubber having a Shore "A" durometer of about 50 to 65.

* * * * *